(No Model.) 3 Sheets—Sheet 1.
J. A. BIDWELL.
DEVICE FOR SEPARATING TURNINGS FROM FINISHED SCREWS IN SCREW MAKING MACHINES.
No. 519,563. Patented May 8, 1894.
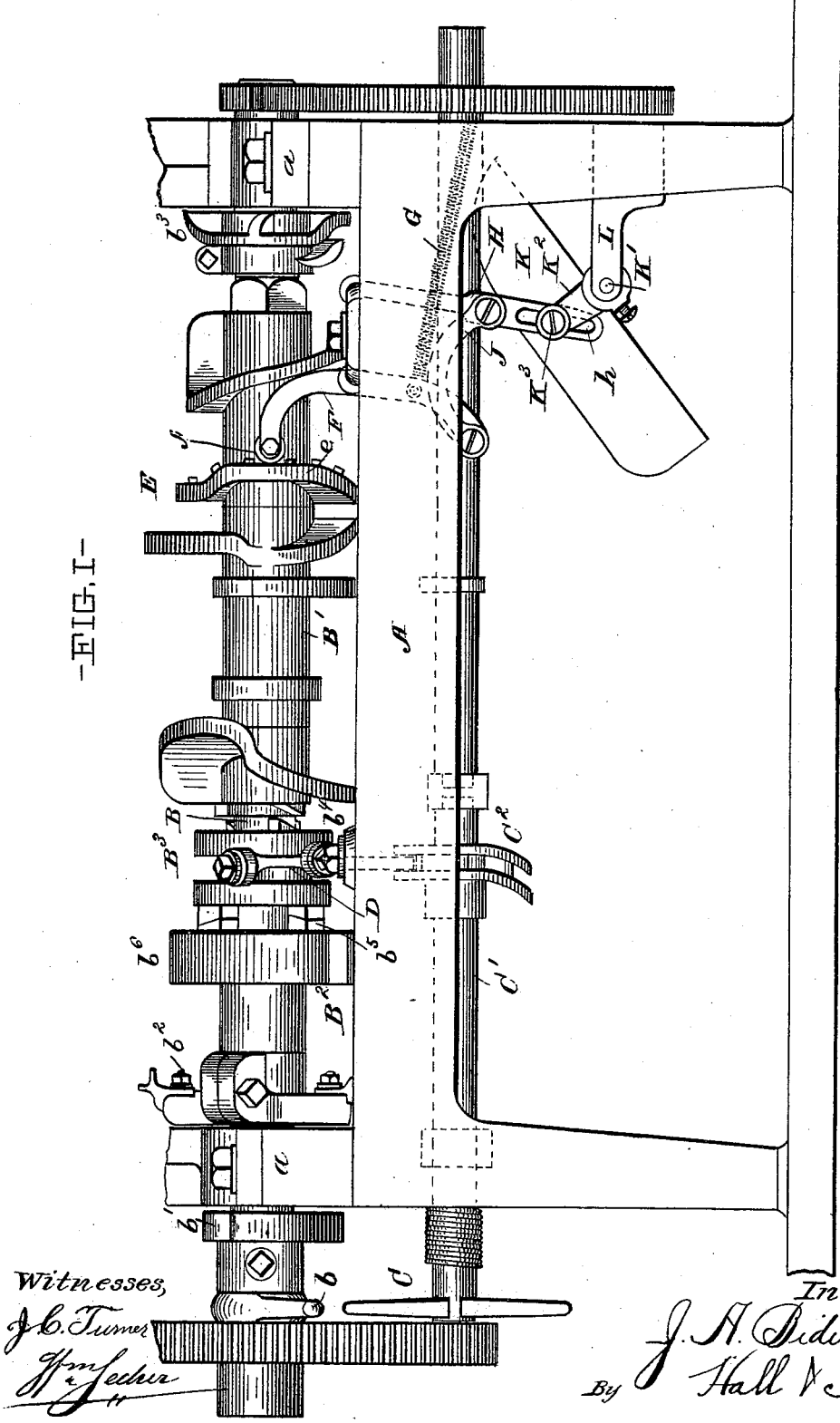

(No Model.)  3 Sheets—Sheet 2.
J. A. BIDWELL.
DEVICE FOR SEPARATING TURNINGS FROM FINISHED SCREWS IN SCREW MAKING MACHINES.
No. 519,563. Patented May 8, 1894.
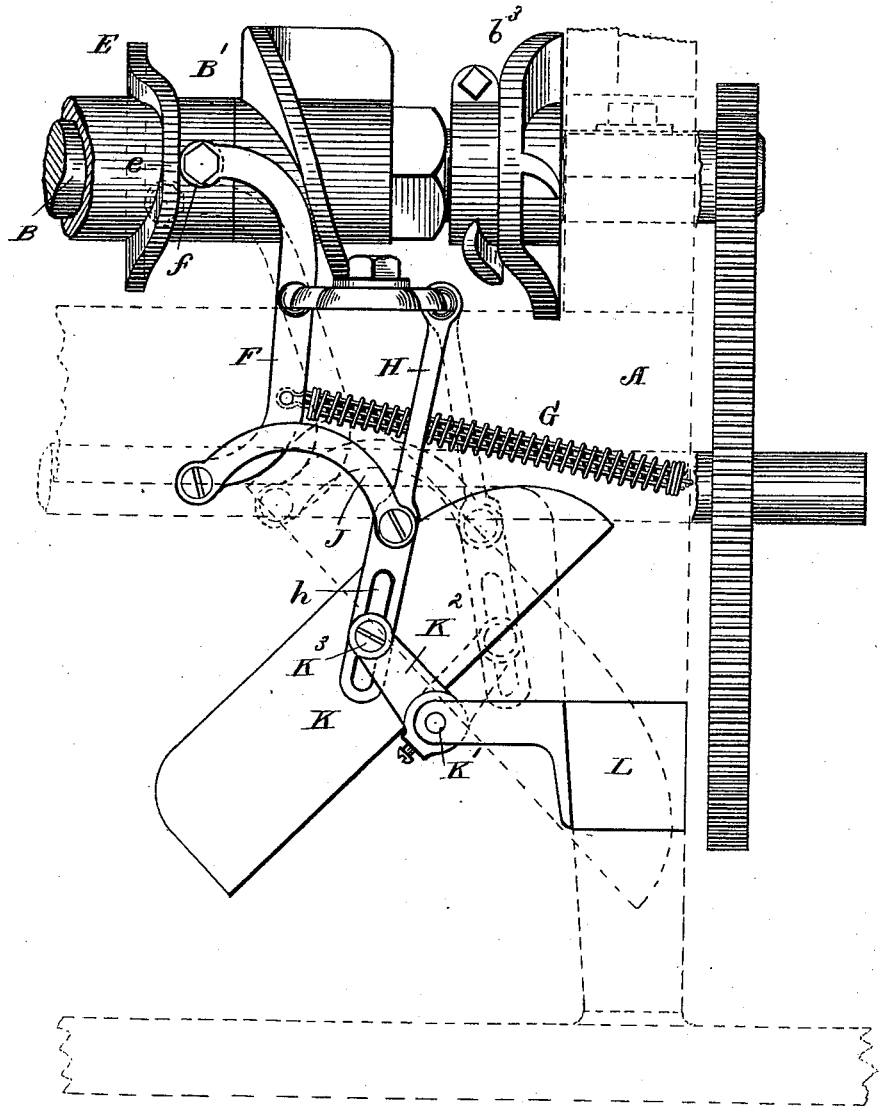
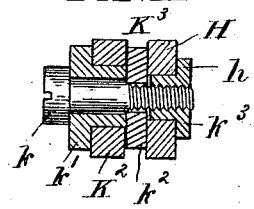
Witnesses,
Inventor (No Model.)
3 Sheets—Sheet 3.
J. A. BIDWELL.
DEVICE FOR SEPARATING TURNINGS FROM FINISHED SCREWS IN SCREW MAKING MACHINES.
No. 519,563.
Patented May 8, 1894.
- FIG. IV -
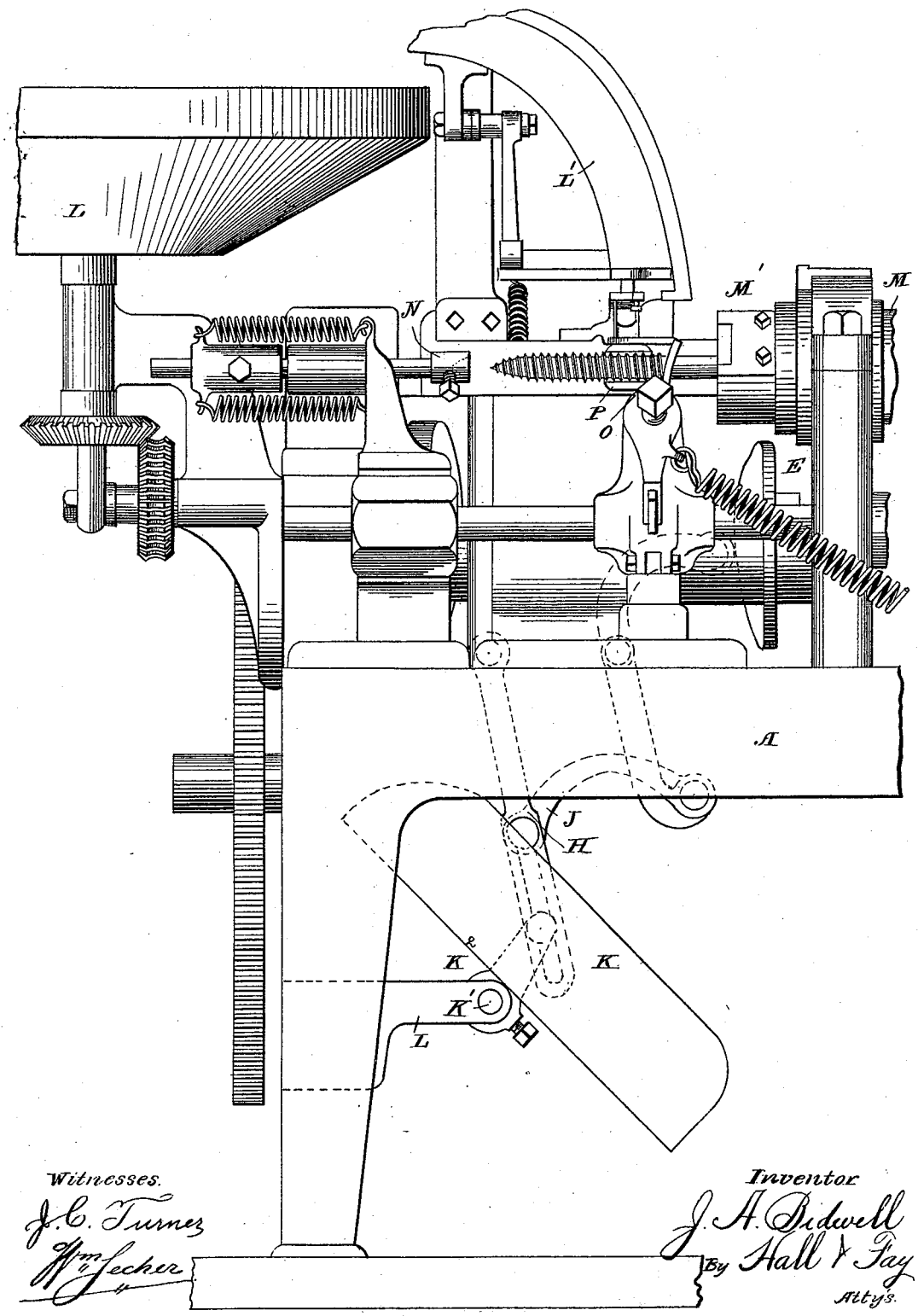
Witnesses.
J. C. Turner
Wm Lecher
Inventor
J. A. Bidwell
By Hall & Jay
Attys.

UNITED STATES PATENT OFFICE.

JASON A. BIDWELL, OF CLEVELAND, OHIO.

DEVICE FOR SEPARATING TURNINGS FROM FINISHED SCREWS IN SCREW-MAKING MACHINES.

SPECIFICATION forming part of Letters Patent No. 519,563, dated May 8, 1894.

Application filed December 29, 1893. Serial No. 495,066. (No model.)

*To all whom it may concern:*

Be it known that I, JASON A. BIDWELL, a citizen of the United States, and a resident of Cleveland, county of Cuyahoga, and State of Ohio, have invented certain new and useful Improvements in Devices for Separating the Turnings from the Finished Screws in Screw-Making Machines, of which the following is a specification, the principle of the invention being herein explained and the best mode in which I have contemplated applying that principle, so as to distinguish it from other inventions.

The annexed drawings and the following description set forth in detail one mechanical form embodying the invention; such detail construction being but one of various mechanical forms in which the principle of the invention may be used.

In said annexed drawings—Figure I, represents a side elevation of as much of a screw-making machine, as will illustrate my improvement; Fig. II, an enlarged side elevation of the parts constituting my improvement; Fig. III, a sectional detail view of the sliding stud upon the arm of the chute shaft, and Fig. IV, a side elevation, from the opposite side of the machine to the one shown in Figs. I and II, showing the spindle in which the screw blank is held, the rest against which it is held, the thread cutting tool, and other parts of the machine, the view illustrating the point of discharge for the finished screw in its relation to the separating device.

The machine is constructed substantially similar to the ordinary screw making machine, and has a frame, A, in which all of the moving parts of the machine are supported. A continually revolving shaft, B, is journaled in bearings, $a$, upon the ends of the frame, and carries a radially projecting finger, $b$, which engages a star wheel, C, upon the end of a shaft, C'. The shaft B carries cams, $b'$ and $b^2$, at the rear bearing, and a cam, $b^3$, at the forward bearing, and has two quills, B' and B², upon it, the opposed ends of which are formed with clutches, respectively $b^4$ and $b^5$, which may alternately be engaged by a clutch collar, B³, which slides upon and revolves with the shaft B. Said clutch collar has a peripheral groove into which one arm of a lever, D, engages. Said lever is fulcrumed upon the machine frame and has its other arm engaging a grooved cam, C², upon the shaft C'. By means of this cam and lever, the clutch may be shifted so as to cause one or the other of the quills to revolve with the shaft. The forward quill B', has a number of cams which, by suitable connections,—not shown,—actuate the picking up and pointing of the screw blank, and the discharge of the finished screw. The rear quill B², carries a cam, $b^6$, which controls the mechanism governing the number of threads to the inch, to be cut into the blank. The cams $b'$ and $b^2$ upon the shaft, control the action of the cutting tool in cutting the thread in the screw in the proper manner and to the proper depth. The cam $b^3$, controls the means whereby the cutter is carried by the screw upon its back stroke without touching the screw and injuring the screw thread. The cams upon the shaft and the rear quill B² thus control the cutting of the thread, while the cams upon the forward quill control the picking up and pointing of the blank and the discharging of the finished screw.

The screw blanks are fed from a hopper, L, down an inclined chute, L', to a revolving spindle, M, which carries a chuck, M', in which the screw blank is held by its head while being pointed and threaded. A pointer, N, operates against the end of the screw blank, serving to make a suitable point upon the same. The mechanism for feeding the screw blank to the chuck, for operating the latter to grasp and release the blank, and for pointing the end of the blank is actuated by the cams upon the forward quill by connections which form no part of the present invention, and which are too numerous and intricate to be here illustrated and described. The cutting tool O, cuts the thread, and is fed forward, in contact with the blank, and backward, out of contact with the blank, by suitable connections with the cams upon the rear quill, which connections do not form part of the present invention and are too numerous and intricate to be here illustrated and described. A rest, P, is opposed to the cutter, so as to support the blank against the lateral thrust of the cutter. The forward quill B', carries a cam, E, having its greater portion plainly annular, and having a bulge, e. A lever, F, is suitably fulcrumed upon the machine frame, and has an inwardly projecting roller, f, upon its upper end, which roller bears against the face of the cam E, so that the lever may be rocked by the bulge upon the cam. A spring, G, is attached to the machine frame and to the lower arm of the lever, so as to force the roller upon the upper arm of the lever against the face of the cam. An arm, H, is pivoted upon the machine frame at its upper end, and has a longitudinal slot, h, in its lower portion. A curved link, J, is pivoted at its ends to the lower end of the cam lever F and to the arm H, so that said arm may be rocked by the movement of the lever. The curved shape of the link admits of the lengthening and shortening of the actual length of the link,—by less or more bending and curving the latter,—so as to adjust the swing of the rocking arm in its relation to the cam lever.

A chute, K, open at both ends, is secured at about the middle of its bottom to a rock shaft, K', journaled in suitable bearings, L, upon the machine frame. One end of said shaft has an arm, K², the end of which has a laterally projecting stud, K³, which projects into and slides in the slot of the rocking arm. Said stud K³ is illustrated in section in Fig. III, the slotted portion of the rocking arm and the end of the arm of the rock shaft being also shown in section. The stud consists of a bolt, k, having a screwthreaded end, and an enlarged head. A bushing, k', fits upon the smooth portion of the bolt, and fits in a hole in the end of the arm upon the rock shaft, having a flange bearing against the outer side of the arm. A washer, k², bears against the end of said bushing, and is interposed between the arm upon the rock shaft and the slotted arm. A nut bushing, k³, is screwed upon the threaded portion of the bolt, and fits to slide in the slot of the rocking arm, having a flange bearing against the inner face of said slotted rocking arm. By tightening the nut bushing upon the bolt, any lost motion caused by wear, may readily be taken up.

When the machine is in operation, the shaft B is continually revolved by its connection to the power source and in connection with the other parts of the machine, some of which parts are not included in the present invention and are therefore not illustrated. The finger upon the shaft will strike the arms of the star wheel, and will thus cause said wheel, its shaft, and the cam upon the same, to make one revolution for each number of revolutions of the operating shaft B, corresponding to the number of arms in the star wheel. We will assume that the forward quill is not revolving and in the position illustrated in the drawings, while the cams upon the shaft and the cam upon the rear quill are allowing the cutter and its appurtenances to cut the thread in the screw blank. The metal turnings from said blank will drop down upon the chute, which is arranged beneath the revolving jaws which hold the screw blank, and said turnings will be guided by the chute to a suitable receptacle beneath the machine frame. When the actuating shaft B has made the requisite number of revolutions to cause the clutch lever actuating shaft C to make one revolution, the cam upon said shaft will shift the clutch to engage the forward quill, causing the latter to revolve. The chute actuating cam will thus tilt the chute in an opposite inclination,—as indicated by dotted lines in Fig. II,—at the same time the appropriate cam upon the quill actuates the discharge mechanism to discharge the finished screw, which will thus slide down the chute to the forward end of the machine, where a suitable receptacle for the screws may be provided. The forward quill will make one revolution with the shaft, when the finger upon the actuating shaft will revolve the shaft C and its cam to again shift the clutch,—the chute having, in the mean time, been shifted to again conduct the turnings beneath the machine.

When the separating attachment is employed with a machine making small screws, the turnings may adhere to the bottom of the chute, being too light to overcome the friction against the bottom of the chute. The cam bulge may in such case be provided with a series of knobs, e', or other irregularities, which will cause the chute actuating lever and the chute to be vibrated so as to shake out the turnings before the chute is tilted. If desired, the entire cam face may be provided with the knobs, so as to cause the chute to vibrate when discharging the screws as well as when discharging the turnings. This separating device is of great utility in machines making screws from steel or semi-steel, in which the turnings are formed in more or less complete cork screw spirals.

In making screws from wire or rod of bronze or iron, the turnings from the thread cutter break into short chips which may easily be separated from the finished screws by screening the product, when the small chips will drop through the screen. When making screws from steel or semi-steel, it has been necessary to separate by hand, the screws from the corkscrew-like turnings, and the extra labor required for this separation has increased the cost of making screws from such material,—now generally employed,—quite considerably; besides requiring the services of well-trained and patient help in separating the tangled turnings and screws. By the employment of my device for separating the turnings from the screws, as such turnings and screws are respectively discharged from the tools forming the screws, all the above-mentioned expense and trouble is avoided, and the screws are discharged free from the turnings and in a separate place.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. In combination with mechanism for operating the screwthreading and discharging of screws in a screw making machine, a chute arranged beneath the discharge of the machine and movable to deliver at two separate points, and mechanism connected to the operating mechanism and to said chute to move the same to deliver the turnings at one point and the finished screws at another point, substantially as set forth.

2. In combination with mechanism for operating the screwthreading and discharging of screws in a screw making machine, a chute pivoted beneath the discharge of the machine to oscillate toward two separate points, a cam receiving motion from the operating mechanism, and means connecting said cam and chute whereby the chute is alternately tilted to deliver the turnings at one point and the finished screws at another point, substantially as set forth.

3. In a screw making machine, the combination with a shaft having suitable connection to operate the screwthreading and discharging mechanism, of a chute pivoted beneath the discharge of the machine to swing to discharge at two separate points, a cam receiving intermittent motion from said shaft, and means connecting said cam and chute whereby said chute is tilted into its two positions by said cam, substantially as set forth.

4. In a screw making machine, the combination of a shaft having means for operating the screwthreading mechanism, a quill upon said shaft and carrying means for operating the gripping and discharging mechanism of the machine, a clutch sliding upon and revolving with the shaft and engaging a clutch upon said quill, means actuated by the shaft for intermittently throwing said clutches into engagement, a cam upon the quill, a chute pivoted beneath the discharge of the machine to swing and discharge at two separate points, and mechanism connecting said cam with said chute to alternately tilt the same into its two positions to discharge the turnings at one point and the finished screws at another point, substantially as set forth.

5. In a screw making machine, the combination of a revolving shaft having means for operating the screwthreading mechanism and provided with a radially projecting finger, a quill having means for operating the gripping and discharging mechanism and formed with a clutch at one end, a clutch sliding upon and revolving with the shaft and adapted to engage the clutch upon the quill, a shaft parallel with the operating shaft and provided with a star wheel engaged by the radiating finger and with a cam, a lever connected to shift the clutch and engaging said last mentioned cam, a cam upon the quill, a chute pivoted beneath the discharge of the machine to deliver at two separate points, and mechanism connecting said cam and chute to tilt the latter to alternately discharge the turnings at one point and the finished screws at another point, substantially as set forth.

6. In a screw making machine, the combination of a chute pivoted to rock at its middle and arranged beneath the discharge of the machine, a cam receiving intermittent motion from the operative mechanism of the machine, and a lever bearing against said cam and connected to said chute to rock it to alternately deliver at its opposite ends, substantially as set forth.

7. In a screw making machine, the combination of a chute arranged beneath the discharge of the machine and pivoted upon a transverse rock shaft at its middle, an arm upon said rock shaft and having a stud, an arm pivoted at one end and having a slotted end engaging said stud, a cam receiving intermittent motion from the operative mechanism of the machine, a lever pivoted to have one end bear against said cam, and a link connecting the other arm of said lever and the slotted arm, substantially as set forth.

8. In a screw making machine, the combination of a cam connected to receive intermittent motion from the operative mechanism of the machine, a lever pivoted to have one end bear against said cam, a chute pivoted at its middle to discharge at its opposite ends, an arm pivoted at one end and movably connected to rock said chute, and a curved link between said arm and the lever, substantially as set forth.

9. In a screw making machine, the combination of a cam connected to receive intermittent motion from the operative mechanism of the machine and formed with a plain annular face having a bulge at one point, a lever pivoted to have the end of its upper arm bearing against the face of the cam, a spring attached to said lever to force said end against the cam, an arm pivoted at its upper end and having a slotted lower end, a link connecting the lower end of the lever and said arm, a rock shaft having an arm provided with a stud engaging the slot of the arm, and a chute secured at its middle upon said shaft, substantially as set forth.

10. In a screw making machine, the combination of a cam connected to receive intermittent motion from the operative mechanism of the machine and provided with knobs upon its cam surface, a lever pivoted to have one end bear against said cam surface and having means for yieldingly holding it against said surface, a chute pivoted to discharge at two separate points, and mechanism connecting the lever and said chute to tilt said chute into its two positions and to vibrate the same, substantially as set forth.

11. In a screw making machine, the combination of a continually revolving shaft having means for operating the screwthreading mechanism and provided with a radiating finger, a quill upon said shaft having means for operating a part of the screwthreading mechanism and formed with a clutch, a quill upon the shaft having means for operating the gripping and discharging mechanism and formed with a clutch, a clutch sliding upon and revolving with the shaft and adapted to alternately engage the clutches upon the quills, a lever engaging said clutch with one end, a shaft journaled parallel with the operating shaft and having a star wheel engaged by the radiating finger upon the latter and having a cam engaging the clutch operating lever, a cam upon the quill operating the gripping and discharging mechanism, a lever having one end bearing against said cam, an arm pivoted at one end and having its other end slotted, a link between the lever and said arm, a rock shaft having an arm provided with a stud engaging the slot in the end of the slotted arm, and a chute secured at its middle upon said rock shaft, substantially as set forth.

12. In a screw making machine, the combination of an arm pivoted at one end and formed with a longitudinal slot at its other end and receiving intermittent rocking motion, a rock shaft having a chute secured at its middle upon said shaft and formed with an arm, a bushing inserted through said arm, a screw bolt inserted through said bushing and through the slotted arm, a washer between the slotted arm and the rocking arm, and a nut bushing upon the end of the screw bolt and within the slot of the slotted arm, substantially as set forth.

In testimony that I claim the foregoing to be my invention I have hereunto set my hand this 27th day of December, A. D. 1893.

JASON A. BIDWELL.

Witnesses:
WM. SECHER,
DAVID DAVIES.